Aug. 17, 1926.
J. HEBER
1,596,657
APPARATUS FOR PRESERVING POSTS
Filed Dec. 6, 1923
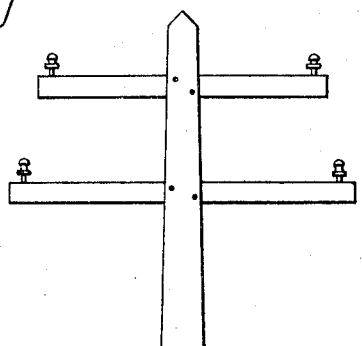
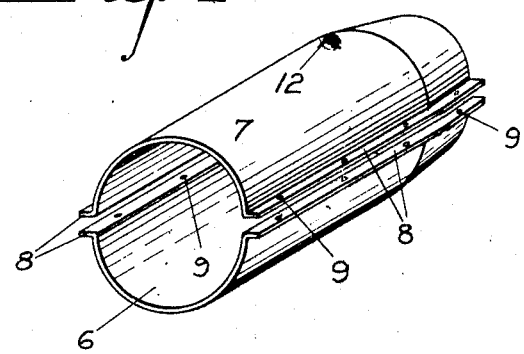
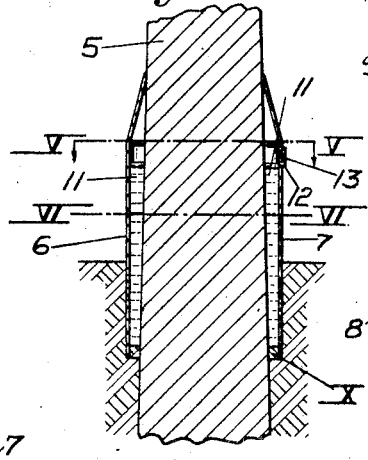
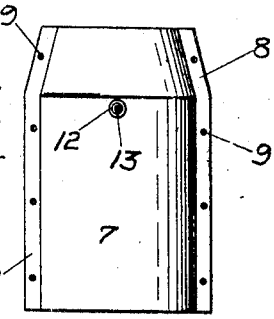
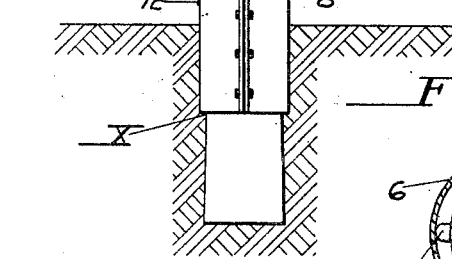
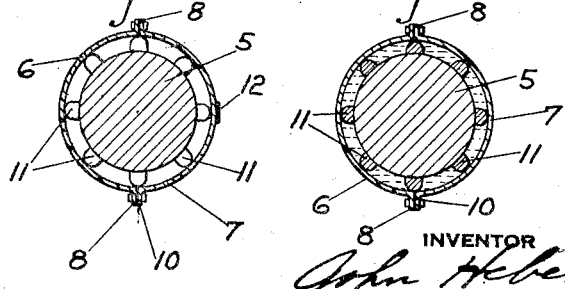
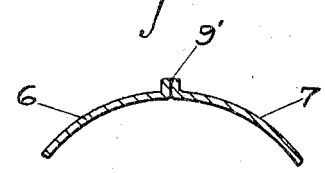
INVENTOR
John Heber
by W. D. Doolittle
his attorney.

Patented Aug. 17, 1926.

1,596,657

UNITED STATES PATENT OFFICE.

JOHN HEBER, OF NEW MARTINSVILLE, WEST VIRGINIA.

APPARATUS FOR PRESERVING POSTS.

Application filed December 6, 1923. Serial No. 678,915.

This invention is for a method of and an apparatus for preserving posts and poles to prolong the life thereof, and protect them against the attacks of insects, rot, decay, oxidation, and weather conditions at the place most subject to the attack of such deteriorating causes.

It is a matter of common knowledge that poles and posts and similar supporting or structural elements anchored in the earth are most subject to decay from a point a few inches above the ground line to a point several inches below the ground. This is probably due to the fact, principally, that the alternating effects of wet and dry conditions, together with the presence of air, are most harmful at this point, and to the fact that this point is most subject to varying temperature and weather conditions. The presence of injurious insects is also confined mostly to the top soil.

The present invention has for its principal object to provide at this point, or any other points most subject to these deteriorating causes, a quantity of oil or other preservative, which may be replenished from time to time, whereby the poles or posts may be kept in a constant state of saturation and consequently well protected.

These and other objects and advantages are attained by my invention, one form of the structure of which is illustrated in the accompanying drawings.

In the drawings:

Fig. 1 illustrates a pole for the support of electrical conductors showing a device for practicing and embodying my invention applied thereto;

Fig. 2 is a perspective view of one form of the device;

Fig. 3 designates a vertical section through the device as applied to the pole;

Fig. 4 is an elevation of the device at right angles to the position shown in Fig. 1;

Fig. 5 is a horizontal section in the plane of line V—V of Fig. 3;

Fig. 6 is a similar section in the plane of line VI—VI of Fig. 3; and

Fig. 7 is a partial section showing a soldered joint.

In the drawings, 5 designates a pole of wood or metal to be protected. While I have illustrated a pole for supporting electrical conductors, it will be obvious that the invention is equally applicable to poles and posts of other types for other purposes.

Applied to the pole 5, with its top above the ground line and its lower end below the ground line, is the metallic protecting device, which is preferably formed of a plurality, preferably two, of longitudinal sections 6 and 7 having a gradual taper at their upper ends. The sections have longitudinal side flanges 8 in which are registering holes 9 through which bolts, rivets, or other securing devices may pass, or which may be soldered together, as shown at 9' in Fig. 7. When secured by fastening means, a gasket 10 may be interposed between the flanges.

The upper inwardly tapered ends fit close to the pole in order to shed water and provide a surface on which dirt and other foreign particles can not collect. Except where the upper end contacts with the pole, the device is spaced away from the pole. In order to hold the device concentric with respect to the pole and at the same time support the metal plates against crushing strains and transmit lateral moments of pressure into the supporting earth, a series of spaced apart vertically extending ribs or strips 11, of wood or metal, are applied to the pole before the protector is applied thereto. These ribs are secured in a predetermined position with respect to the part of the pole to be protected. The tops of these strips are below the tapered top of the protecting shell. In one of the plates at a point above the tops of the ribs 11, is an opening 12 into which a removable plug 13 is screwed.

By reason of the shell being formed in sections, the embracing shell can, by excavating around the poles, be applied to poles now standing. It can also be applied to new poles under course of erection.

After the shell has been applied to the post, the bottom of it is closed by forcing clay or pitch or cement, or other sealing material around the bottom thereof, as indicated at $x$. When this has been done, the earth around the pole may be filled in. A quantity of crude oil, tar, creosote, or other preservative is poured into the intervening space between the shell and the post through opening 12, after which the plug 13 is inserted. This quantity of preservative is gradually absorbed by the wood, if the pole is a wooden one, and will not only soak into that portion of the wood which is surrounded, but, due to the capilarity of the fibers, will permeate the wood both above and below the shell. Similar effects are secured when a metal pole is protected. This quantity of preservative may be sufficient to last for a considerable time, and, when exhausted, may be renewed.

Thus, in addition to the incidental protection afforded by the shell, a quantity of protecting fluid may, from time to time, be applied and the shell will act as a reservoir to insure a sufficient supply to keep the pole or post saturated.

By reason of the filling opening being above the ribs, the oil can flow into all of the spaces between the ribs. As the shell is preferably formed of a nonrusting sheet metal, it can be readily hammered into shape to conform to such irregularities as exist in individual poles or posts of the same class. Various sizes may also be made.

The ribs and the casing, furthermore, serve to reinforce the pole and, due to the increased area presented to the surrounding earth, assist in more securely anchoring the pole in the earth.

Various changes and modifications may be made in the construction of the shell within the contemplation of the invention and under the scope of the appended claim.

I claim as my invention:

The combination with a pole, of a plurality of longitudinally spaced apart strips secured thereto and extending vertically therealong, and a casing extending above and below the ground level comprised of a plurality of vertical sections secured together and embracing that portion of the pole to which the strips are secured, said sections having contracted upper portions and longitudinally extending flanges, means for securing the flanges together, means in one of the sections above the strips through which preservative may be poured, and means closing the bottom of the casing against the escape of the preservative.

In testimony whereof I affix my signature.

JOHN HEBER.